(12) United States Patent
Liu et al.

(10) Patent No.: US 11,112,088 B2
(45) Date of Patent: Sep. 7, 2021

(54) QUANTUM DOT OPTICAL FUNCTION PANEL

(71) Applicant: HUIZHOU CHUANGYIDA NEW MAT CO., LTD, GuangDong (CN)

(72) Inventors: XiaoDong Liu, GuangDong (CN); HaiTao Huang, GuangDong (CN)

(73) Assignee: HUIZHOU CHUANGYIDA NEW MAT CO., LTD, GuangDong (CN)

( * ) Notice: Subject to any disclaimer, the term of this patent is extended or adjusted under 35 U.S.C. 154(b) by 0 days.

(21) Appl. No.: 16/164,812

(22) Filed: Oct. 19, 2018

(65) Prior Publication Data
US 2019/0360662 A1 Nov. 28, 2019

(30) Foreign Application Priority Data
May 22, 2018 (CN) .......................... 201810495198.3

(51) Int. Cl.
| | |
|---|---|
| F21V 9/38 | (2018.01) |
| F21V 3/04 | (2018.01) |
| F21V 31/00 | (2006.01) |
| B29C 48/21 | (2019.01) |
| B29L 31/34 | (2006.01) |

(52) U.S. Cl.
CPC .............. *F21V 9/38* (2018.02); *F21V 3/049* (2013.01); *F21V 31/005* (2013.01); *B29C 48/21* (2019.02); *B29L 2031/3475* (2013.01)

(58) Field of Classification Search
CPC .................... H01J 23/06; H01J 29/488; G02F 2001/133614; G02F 1/1336; G02F 1/133614; F21V 9/38; F21V 3/049; F21V 31/005; B29C 48/21; B29C 48/49; B29C 48/07; B29C 48/18; B29L 2031/3475; B29L 2009/00; B29L 2007/002; H05B 33/22; H05B 33/14; C09K 11/665; C09K 11/08; B32B 3/08; B32B 3/30; B32B 27/08; B32B 27/302; B32B 2307/418; B29K 2025/06; B82Y 20/00; H01L 27/322; H01L 51/502; H01L 33/504; H01L 33/502; H01L 2933/0083; B02B 6/0003; G02B 5/207

See application file for complete search history.

(56) References Cited

U.S. PATENT DOCUMENTS

2015/0109814 A1* 4/2015 Chen .................... G02B 6/0073
362/606
2018/0072949 A1* 3/2018 Satake ................... C09K 11/02

OTHER PUBLICATIONS

CN107219684 (Year: 2017).*

\* cited by examiner

*Primary Examiner* — Georgia Y Epps
*Assistant Examiner* — Jose M Diaz

(57) ABSTRACT

A quantum dot optical function panel and its preparation method comprises a functional layer, a condensation layer and a diffusion layer which compose a multilayer structure. Said functional layer is located between condensation layer and diffusion layer. The functional layer comprises a main layer and quantum dots uniformly distributed in main layer. Said condensation layer comprises a condensation substrate layer and condensation bulges distributed over the upper surface of condensation substrate layer. Said diffusion layer comprises a diffusion substrate layer and diffusion bulges distributed over the lower surface of diffusion substrate layer. The condensation layer and diffusion layer of the quantum dot optical function panel of the present invention can resist oxygen and water vapor to a certain extent, protecting the quantum dots well.

1 Claim, 2 Drawing Sheets

QUANTUM DOT OPTICAL FUNCTION PANEL

BACKGROUND OF INVENTION

1. Field of the Invention

The present invention relates generally to the technical field of quantum dot optical function panel, and more particularly to a quantum dot optical function panel With multilayer structure and its preparation method.

2. Description of Related Art

As a new generation luminescent material, the quantum dot is characterized by narrow half peak width, adjustable color and high quantum yield. When a light art electric stimulus is applied to the quantum dot material in diameter of 2~10 nm, the quantum dot die is excited to emit monochromatic light on a specific frequency, the frequency or color of the light is determined by the type, size and shape of quantum dot, so as to implement accurate tuning. For the quantum size effect revealed by the quantum dot, the grain size can be regulated by controlling the synthesis condition, so as to implement the tuning of quantum dot fluorescence spectrum in the whole visible light region, green to red fluorescence can be emitted. For example, a 2 nm sized quantum dot can absorb long wave red, displaying blue, and an 8 nm sized quantum dot can absorb short wave blue, displaying red. Besides the adjustable emission wavelength, the fluorescence intensity of quantum dot can be controlled by changing the component proportion of kernel material. In addition, the quantum dot excitation spectrum is relatively wide, whereas the emission spectrum is relatively narrow. As the energy of excitation light source is larger than the quantum effective energy gap, the same quantum dot can be excited by multiple light sources, and different quantum dots can be excited by the same light source. These excellent characteristics lead to extensive application prospects of quantum dots in the fields of LED, nonlinear optical devices, biomarkers and fluorescence detection.

In the field of display technique, the quantum dot display is of innovative semiconductor nanocrystal technology, the quantum dot display technique has changed the back light type of screen, the quantum dots perform color development, the back light module performs back lighting only using blue light and without white light. The quantum dots are in charge of generating green light and red light, the application of quantum dot function unit and blue light source makes the quantum dot display has purer color display effect than conventional display. As purer red light and green light can be obtained after the quantum dots are excited, the light rays can be conveyed accurately, the color expression is purer, the saturation is higher, and the power consumption and heating can be reduced greatly. Therefore, the RGB primary colors displayed by quantum dots are purer, the chromatogram is more continuous, the color expression is purer, fresher and tensile, the display effects of display equipment can be enhanced greatly, such as color range, brightness and contrast, and the cost is lower. The fuller and fresher colors obtained by this technique are very attractive for games and videos, design and drawing, or home and office.

The quantum dot is inorganic matter, but in fact, the nano-sized quantum dot is quite sensitive to external environment, it fears high temperature as fluorescent powder does, and it fears water and oxygen as electroluminescent organic small molecule (OLED) does. The quantum dot optical film on the present market is relatively expensive, the cost of the Barrier Film accounts for almost half of the whole optical film, mostly for quantum dot material to resist water and oxygen. In the course of commercialization, the research and development personnel expend a lot of energy and costs on resisting water and oxygen. The quantum dot display is also likely to generate granular sensation when displaying, it may because the quantum dot film is prepared by coating technique, and the quantum dots in the UV light cured glue are difficult to be dispersed completely, the quantum dots inevitably agglomerate, settle or float. Therefore, when the product detail is magnified in the inspection of finished product, some quantum dot particulates can be found in the film. In addition, in the assembly of quantum dot optical film, if the sequence shifts up slightly or a little far from the light source, the light is reflected repeatedly when passing through the layers of optical film, the times of passing through the quantum dot layer is insufficient, the red-green light conversion is insufficient, leading to bluish phenomenon. The present quantum dot back light technology is still an extension from the VA screen (LCD) panel, the light leakage and color cast of LCD panel also exist in the quantum dot display.

As it is known that there will be such physical phenomena as refraction, reflection and scattering when the light passes through the media with different refractive indexes during irradiation. As a sort of optical function panel, the light diffuser plate adjusts the light refraction, reflection and scattering to change the light path by adding inorganic or organic light diffusant to PMMA, PS, PC and PP substrates, or arranging several micro eigenstructures on the surface of these optical substrates, the light beam angle is changed to 160~176°, so that the incident light is fully scattered, leading to optical diffusion. The light diffuser plate can fully scatter the incident light to implement softer and more uniform irradiation effect. It is extensively used in LCD, LED lighting and imaging system. The conventional diffuser plate is a function plate of single-layer structure. It has better light transmittance, masking property and durability, but its function is relatively simple, the cost is higher when it is assembled with optical devices with other functions, limiting its further application.

In order to expand the application area of quantum dot material and to avoid the defects in the cost and application performance of conventional quantum dot display, this inventor integrates and improves the conventional quantum dot film and optical diffuser plate preparation methods, and proposes the following technical proposal.

SUMMARY OF THE INVENTION

The purpose of the invention is to expand the application range of quantum dot materials, to make up for the defects of the traditional quantum dot display in cost and application performance, and to provide a quantum dot optical function panel and a preparation method thereof. The technical, scheme is that a quantum dot optical function panel comprises: a functional layer (1), a condensation layer (2) and a diffusion layer (3) which form a multilayer structure;

wherein the functional layer (1) is disposed between the condensation layer (2) and the diffusion layer (3), the functional layer (1) includes a main layer (11) and quantum dots (12) uniformly distributed in main layer (11);

the condensation layer (2) includes a condensation substrate layer (21) and condensation bulges (22) distributed over the upper surface of condensation substrate layer (21);

the diffusion layer (3) includes a diffusion substrate layer (31) and diffusion bulges (32) distributed over the lower surface of diffusion substrate layer (31).

More particularly, wherein the condensation bulges (22) are continuous semicircular or are bulge structures in cross section, or said condensation bulges (22) are continuous jagged structures in cross section; said diffusion bulges (32) are continuous semicircular or are bulge structures in cross section.

More particularly, wherein the main layer (11) comprises a first main layer (111) and a second main layer (112) combined with each other, said quantum dots (12) include red fluorescence quantum dots (121) and green fluorescence quantum dots (122); the first main layer (111) adheres to one side of condensation layer (2), red fluorescence quantum dots (121) are distributed in it uniformly. The second main layer (112) adheres to one side of diffusion layer (3), the green fluorescence quantum dots (122) are distributed in it uniformly.

More particularly, wherein the quantum dot optical function panel includes a functional layer (1), a condensation layer (2) and a diffusion layer (3), wherein the functional layer (1) is located between condensation layer (2) and diffusion layer (3); the preparation method comprises the following steps:

first, the materials of functional layer (1), condensation layer (2) and diffusion layer (3) are pretreated, and then the materials of functional layer (1), condensation layer (2) and diffusion layer (3) are molten and coextruded by mold, the quantum dot optical function panel of multilayer structure is obtained;

wherein the pretreatment of functional layer (1) material: the material of quantum dots (12) is treated and mixed in the main layer (11) material of functional layer (1) uniformly, wherein the functional layer (11) is made of polymer material with good adhesion and high transmittance property;

the pretreatment of the material of said condensation layer (2): the polymer material with good adhesion and high transmittance property is pelletized as the material for making condensation layer (2);

the pretreatment of the material of said diffusion layer (3): the diffusion particles are mixed in the low-melting modified polymer material, pelletized as the material for making diffusion layer (3).

More particularly, pretreatment of the material of functional layer (1) and the quantum dots (12) are powdered quantum dots, the material of quantum dots (2) is mixed with the polymer material particles for making main layer (11) uniformly by agitator.

More particularly, pretreatment of material of functional layer (1) and the quantum dots (12) are liquid viscous quantum dots. The quantum dots are dissolved by solvent, added to the polymer material particles for making main layer (11), mixed uniformly; finally, the solvent is evaporated to obtain polymer material particles with quantum dots adhering to surface.

More particularly, said polymer material for making condensation layer (2) is mixed with toughener, light stabilizer and antioxidant.

More particularly, said modified polymer material for making diffusion layer (3) is mixed with toughener, light stabilizer and antioxidant. Said diffusion particles are any one of the following materials, polysiloxane polymer micropowder, PS microspheres, PMMA microspheres, nano-SiO2 or nano-TiO2.

More particularly, said optical function panel is molded by extrusion, the condensation bulges (22) are molded on the upper surface of said condensation layer (2); the diffusion bulges (32) are formed on the lower surface of said diffusion layer (3).

More particularly, in the extrusion molding of said optical function panel, the mold discharge gate is provided with a gas protection device, importing nitrogen or argon for gas protection.

More particularly, said quantum dots (12) are the mixture of red fluorescence quantum dots (121) and green fluorescence quantum dots (122).

More particularly, the quantity ratio of the red fluorescence quantum dots (121) to green fluorescence quantum dots (122) is 1:20-1:5.

More particularly, said main layer (11) comprises a first main layer (111) and a second main layer (112) combined with each other, the first main layer (111) adheres to one side of condensation layer (2), the red fluorescence quantum dots (121) are distributed in it uniformly. The second main layer (112) adheres to one side of diffusion layer (3), the green fluorescence quantum dots (122) are distributed in it uniformly.

The purpose of the present invention is to expand the application area of quantum dot material to remedy the defects in the cost and application performance off conventional quantum dot, display, a quantum dot optical function panel and its preparation method are proposed.

The benefits of the present invention are described below:

1. The quantum dot optical function panel of the present invention is composed of multilayer structure. The structural composition and size can be adjusted flexibly, the functional requirements for concealing property, brightness and quantum dot luminescence. Meanwhile, the production of quantum dot function panel is free of the processes of preparing quantum dot film and cleaning and assembling the diffuser plate and quantum film of back light module respectively, and the cost of Barrier Film is saved directly, the operation can be implemented by manipulator completely, the preparation time and cost are saved greatly, the mechanical assembly efficiency and production controllability of back light are enhanced, the complicated procedure of preparing and assembling quantum dot film is prevented, favorable for high efficiency automated production, the production cost is reduced, and the production efficiency is increased.

2. In comparison to conventional quantum dot film product, the present invention avoids such defects as agglomeration of quantum dots in glue, film head blocking, non-uniform distribution and luminescence in the coating technique, so that the uniformity of distribution of quantum dots in the product is enhanced greatly, and the complicated processing steps of coating and UV light source curing are not required, the preparation method is simplified.

3. The preparation method of the present invention is simple, the consumption of quantum dots, the luminance, chromaticity coordinate, color range value, transmittance property and haze of quantum dot function panel can be controlled by regulating the mixing ratio of quantum dots in the preparation process, the thickness of condensation layer, diffusion layer and functional layer, the consumption of quantum dots in main layer or functional layer and the diffusant content.

4. In the present invention, the functional layer of the prepared quantum dot optical function panel is extruded from the polymer material with certain resistance to water and oxygen, the quantum dots are endued with better stability in high temperature and high, humidity and lighting environments, and the condensation layer and diffusion layer clamped outside the quantum dot functional layer have further water, oxygen and scratch proofing effects on the quantum dot functional layer, further protecting the stability of quantum dot function panel in use.

5. The quantum dot optical function panel prepared in the present invention is favorable for subsequent reworking.

6. The preparation method of the present invention is simple, the materials of functional layer, condensation layer and diffusion layer are molten, a polymer function panel with luminescence of multilayer structure is obtained by using multiple extruders and in-mold coextrusion, the quantum dots are dispersed in the functional layer uniformly. As the selected polymer material has better resistance to water and oxygen, fully protecting the fluorescent stability of quantum dot function panel in the high temperature and high humidity environment, and the condensation layer or diffusion layer on its upper and lower surfaces has further water, oxygen and scratch proofing effects on the functional layer of quantum dot optical panel, further guaranteeing the stability of quantum dot luminescent material.

DETAILED DESCRIPTION OF THE INVENTION

Figure 1:
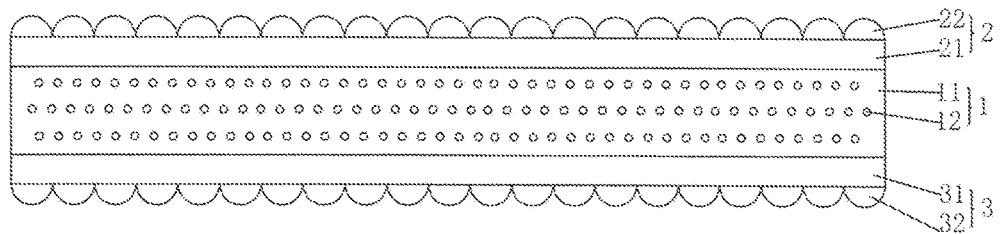
FIG. 1 is a structural representation of Embodiment 1.
Figure 2:
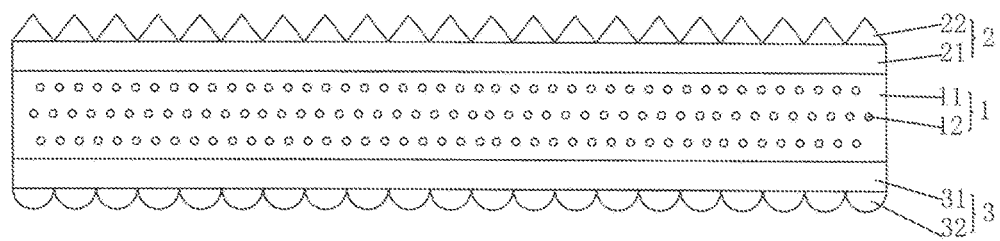
FIG. 2 is a structural representation of Embodiment 2.

The present invention is a sort of quantum dot optical function panel, which comprises a functional layer, a condensation layer and a diffusion layer. The functional layer comprises main layer and quantum dots. The layers are mainly made of waterwhite organic polymer material. The overall structure is made by multiple extruders through in-mold coextrusion. The quantum dots are distributed in the functional layer uniformly, clamped between condensation layer and diffusion layer, a small amount of diffusion particles or similar functional substances can be applied. The condensation layer and diffusion layer can resist oxygen and water vapor to a certain extent, protecting the quantum dots well. The embodiments are described below.

Embodiment 1

Embodiment 1 uses a quantum dot optical function panel with three-layer structure. See FIG. 1, the Embodiment 1 structure comprises a functional layer 1, a condensation layer 2 and a diffusion layer 3. Said functional layer 1 is located between condensation layer 2 and diffusion layer 3.

Said functional layer 1 comprises a main layer 11 and quantum dots 12 uniformly distributed in main layer 11.

Said condensation layer 2 comprises a condensation substrate layer 21 and condensation bulges 22 distributed over the upper surface of condensation substrate layer 21.

Said diffusion layer 3 comprises a diffusion substrate layer 31 and diffusion bulges 32 distributed over the lower surface of diffusion substrate layer 31.

As shown in FIG. 1, said condensation bulges 22 of this embodiment are continuous semicircular or are bulge structures in cross section, said diffusion bulges 32 are continuous semicircular or are bulge structures in cross section.

The three layers of the Embodiment 1 are molded by in-mold coextrusion after the polymer particles are molten, the thickness can be adjusted flexibly by controlling the production parameters. The aforesaid three layers can be made of polymers or copolymers, such as PMMA, PS, PC and PP, the materials are modified generally by adding diffusant, toughener, light stabilizer and antioxidant.

The quantum dots 12 of the Embodiment 1 are the most extensively studied Cd family semiconductor nanocrystal.

The PMMA is used as the material of substrate and the Cd family semiconductor nanocrystal is used as the material of quantum dots 12 to describe the preparation method of Embodiment 1:

Step 1: Pretreat the materials of functional layer 1, condensation layer 2 and diffusion layer 3.

1. For the pretreatment of functional layer 1, the material of quantum dots 12 shall be pretreated as follows: there are two forms of treatment of quantum dot material, one is to prepare powdered quantum dots, the other one is to prepare viscous liquid quantum dots. The powdered quantum dots are characterized by high purity, accurate control and measurement, but they shall be preserved in nitrogen or argon protected atmosphere. The powdered quantum dots are prepared by many times of ultrasonic washing with organic solvent (e.g. dichloromethane, chloroform, ethanol, acetonitrile or n-hexane) after the quantum dots are synthesized, and then centrifuged and oven dried. The viscous liquid quantum dots are prepared by mixing the prepared quantum dot powder with a given amount of oleic acid, oleylamine, tri-n-octylphosphine, trioctylphosphine oxide, n-octyl mercaptan or other analogs.

Pretreatment of functional layer 1. First, the main layer 11 of functional layer is made of polymer material PMMA with good adhesion and high transmittance property. Afterwards, the treated quantum dot material is mixed in the main layer 11 of functional layer uniformly.

When the powdered quantum dots are used, the quantum dot material, toughener and anti-aging additive shall be mixed in the polymer aggregate uniformly by using mixer for future use;

When the viscous liquid quantum dots are used, the quantum dot solution shall be derived from n-hexane solvent, and dripped into the polymer aggregate uniformly, mixed thoroughly, and then the quantum dot material tightly adheres to the surface of the polymer material after the solvent is evaporated, the toughener and anti-aging additive are added in if necessary.

2. Pretreatment of material of said condensation layer 2: the polymer material PMMA with good adhesion and high transmittance property is selected as the material of condensation layer 2, it can be mixed with toughener, light stabilizer and antioxidant additives appropriately.

3. Pretreatment of material of diffusion layer 3: the material of diffusion layer 3 is the modified polymer material with relatively lower melting point, mixed with diffusion particles. The diffusion particles are Poly (methylsilsesquioxane), which can be mixed with toughener, light stabilizer and antioxidant additives appropriately. In addition, said diffusion particles or similar functional substances can be polysiloxane polymer micropowder, PS microspheres, PMMA microspheres, nano-$SiO_2$ or nano-$TiO_2$.

The aforesaid material of condensation layer 2 and material of diffusion layer 3 shall be granulated, oven dried and mixed.

In the aforesaid pretreatment processes, the antioxidant used can be aromatic amine antioxidant, hindered phenol antioxidant, organic sulfide antioxidant, phosphite ester antioxidant and metal ion chelating agent. Said light stabilizer can be light screener, UV absorbers, organic Ni complexes and hindered amine light stabilizer. Said toughener can be ABS terpolymer, MBS terpolymer, CPE, EVA, NBR, ACR, EPDM, MPR or TPU.

Step 2: Prepare quantum dot optical function panel: the materials of functional layer 1, condensation layer 2 and diffusion layer 3 are extruded by three extruders through in-mold coextrusion. The temperature, metering pump pressure, feeding rate and main unit speed of extruder are set, the molten material is compounded in mold of three extruders, and extruded through the die orifice to obtain a three-layer structure plate, the gas protection device is switched on if necessary to import nitrogen or argon to form protective atmosphere. Finally, the functional layer 1 is clamped between condensation layer 2 and diffusion layer 3, and the quantum dots are uniformly distributed over the quantum dot optical function panel in functional layer 1.

As shown in FIG. 1, in this embodiment, in order to enhance the performance of quantum dot optical function panel, in the course of extrusion molding, continuous semicircular or are condensation bulge 22 structures in cross section are molded on the upper surface of condensation layer 2, the luminance of quantum dots can be enhanced. In addition, continuous semicircular or are diffusion bulge 32 structures in cross section are molded on the lower surface of diffusion layer 3, the loss of emitted light can be reduced.

In addition, the quantum dot of the Embodiment 1 can be perovskite quantum dot. The perovskite quantum dot is a semiconductor material with low cost, high carrier mobility, large photoabsorption coefficient, adjustable wavelength and narrow emission spectrum, it has huge potential in the fields of display, electroluminescence, photodetector, laser and solar cell. To be specific, the quantum dot used in the Embodiment 1 can be metal organic halide $CH_3NH_3PbX_3$ or all-inorganic $CsPbX_3$ (X=Cl, Br, I). In order to guarantee the stability of quantum dot, it shall be mixed with oleic acid and oleylamine ligands to form a protection layer, and the temperature of extruder shall be relatively low. The production methods for functional layer 1, condensation layer 2 and diffusion layer 3 of the prepared perovskite quantum dot function panel are close to Embodiment 1.

Embodiment 2

The difference between Embodiment 2 and Embodiment 1 is the preparation of functional layer 1 of quantum dot optical function panel.

In Embodiment 2, the material of functional layer 1 is pelletized by pelietizer to obtain the polymer particles of quantum dots, and molded by extruder through melt extrusion. To be specific:

First, the powdered quantum dot or liquid quantum dot material is obtained by using the method of Embodiment 1, and then the powdered quantum dot or liquid quantum dot material, toughener and anti-aging additive are mixed with the main layer 1 material PMMA of functional layer 1 uniformly by mixer.

Afterwards, the main unit speed, suction rotation speed, main unit current and melt pressure are set, the material is loaded in the feed gate of pelletizer, nitrogen or argon is imported if necessary to form a protective atmosphere. The plastication extruded stay and traction bar are cooled by water tank, dried by blower and pelleted by strand cutter, the particulate material containing quantum dots is obtained. The content of quantum dots in the particulate material containing quantum dots is a little high, this quantum dot particle is dried at 50-80° C. to remove residual moisture, and the quantum dot particulate material is mixed with a given amount of PMMA aggregate uniformly by mixer, the quantum dots are diluted to the required concentration, conveyed by the feed system to the extrusion hopper, coextruded with condensation layer and diffusion layer 3 at melting temperature to obtain the quantum dot optical function panel.

In addition, in Embodiment 2, said condensation bulges 22 are continuous jagged structures in cross section favorable for reworking, the luminance of quantum dots in optical function panel is enhanced.

Embodiment 3

The material of quantum dots 12 in Embodiment 3 is different from Embodiment 1.

As the fluoride fluorescent powder material can emit red fluorescence with narrow half wave width similar to quantum dot, the displayed color range coverage can be increased significantly. The green quantum dot function panel shall be used with blue LED chip and red fluorescent powder, only the light emitted from the three of them can compose three primary colors, so as to construct a high color range display architecture. When the quantum dot function panel contains green and red quantum dots, only blue light is required for back lighting, purer red light and green light can be obtained after the quantum dots are excited, the color expression is purer, the color range value is higher, and the saturation is higher. In the meantime, the plate is resistant to water and oxygen, guaranteeing the luminescent effect of quantum dots. In comparison to conventional quantum dot film, it has such advantages as convenient assembly, high resistance to water and oxygen and low cost.

Figure 3:
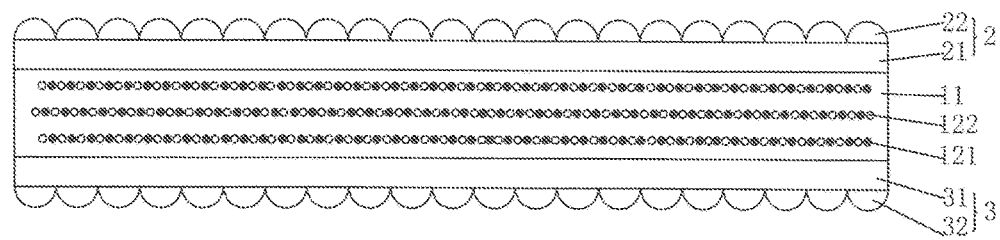
FIG. 3 is a structural representation of Embodiment 3.

As shown in FIG. 3, the difference between the Embodiment 3 and Embodiment 1 is: the quantum dots 12 used in functional layer 1 are green quantum dots 122 and red quantum dots 121 mixed as per a ratio. Generally, the quantity ratio of red fluorescence quantum dots 121 to green fluorescence quantum dots 122 is 1:20-1:5. The ratio in the Embodiment 3 is 1:10, the red quantum dots 121 and green quantum dots 122 are mixed uniformly. The preparation methods for functional layer 1, condensation layer 2 and diffusion layer 3 of quantum dot function panel are close to Embodiment 1.

Embodiment 4

Figure 4:
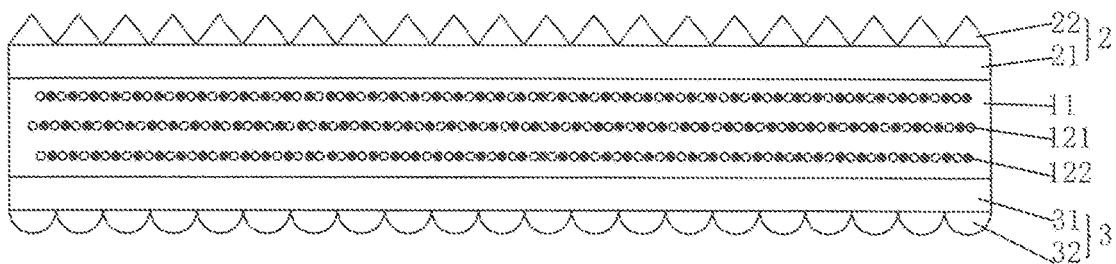
FIG. 4 is a structural representation of Embodiment 4.

As shown in FIG. 4, the preparation method of Embodiment 4 is the same as Embodiment 3, the difference is that said condensation bulges 22 in the Embodiment 4 are continuous jagged structures in cross section, this is identical with Embodiment 2.

Embodiment 5

As the quantum dot is single level structure, the quantum dot can be excited by controlling the size of quantum dot to emit high quality red and green monochromatic light with concentrated spectral energy and pure color, the spectrum of light is very narrow, the color can be regulated accurately to implement accurate color restoration, the color purity is higher, more colors can be generated, and when the quantum dots of two sizes are excited by blue LED to emit light, they emit purer white light together. Based on the excellent pure color output display screen of quantum dots, the colors can be more exquisite, and the coverage of color range can be enlarged effectively. Therefore, we can use green and red fluorescence quantum dots to prepare a quantum dot optical function panel with four-layer structure.

Figure 5:
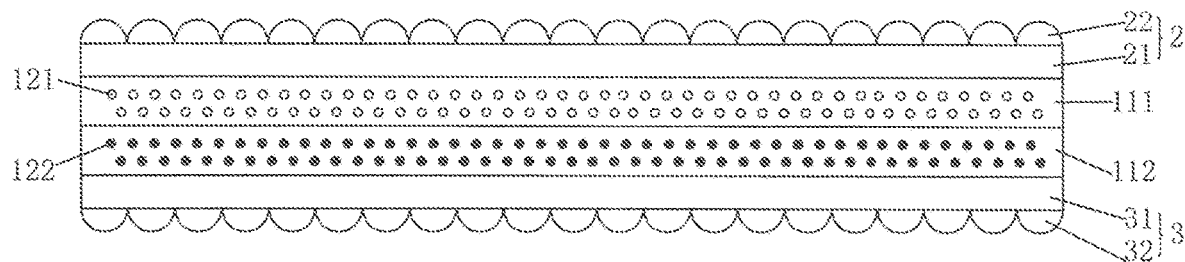
FIG. 5 is a structural representation of Embodiment 5.

As shown in FIG. 5, in the Embodiment 5, the main body 11 of functional layer 1 comprises a first main layer 111 and a second main layer 112 combined with each other, said quantum dots 12 include red fluorescence quantum dots 121 and green fluorescence quantum dots 122; the first main layer 111 adheres to one side of condensation layer 2, red fluorescence quantum dots 121 are distributed in it uniformly. The second main layer 112 adheres to one side of diffusion layer 3, the green fluorescence quantum dots 122 are distributed in it uniformly.

In Embodiment 5, the condensation layer 2 comprises a condensation substrate layer 21 and condensation bulges 22 distributed over the upper surface of condensation substrate layer 21, and the condensation bulges 22 are continuous semicircular or are bulge structures in cross section.

Said diffusion layer 3 comprises a diffusion substrate layer 31 and diffusion bulges 32 distributed over the lower surface of diffusion substrate layer 31, and said diffusion bulges 32 are continuous semicircular or are bulge structures in cross section.

The first main layer 111, the second main layer 112, condensation layer 2 and diffusion layer 3 are made by multiple extruders through in-mold coextrusion. The preparation method for the quantum dot optical function panel is similar to Embodiment 1.

Embodiment 6

Figure 6:
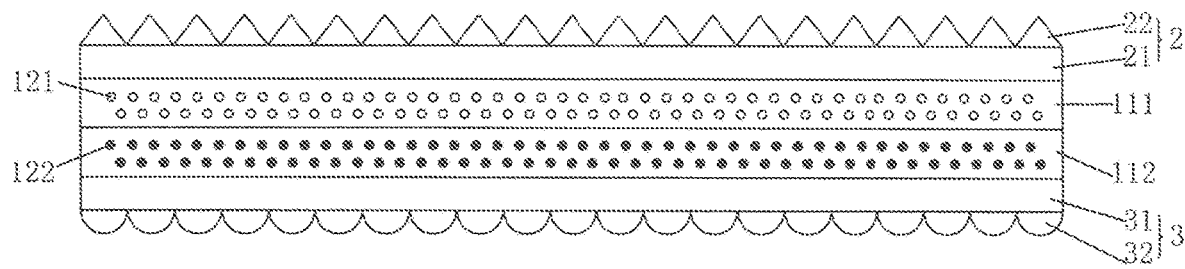
FIG. 6 is a structural representation of Embodiment 6.

As shown in FIG. 6, Embodiment 6 is similar to Embodiment 5, the difference is that in this embodiment, said condensation bulges 22 are continuous jagged structures in cross section.

The above only describes some exemplary embodiments of the present invention. Those having ordinary skills in the art may also make many modifications and improvements without departing from the conception of the invention, which shall all fall within the protection scope of the invention.

We claim:

1. A quantum dot optical function panel, comprising: a functional layer (1), a condensation layer (2) and a diffusion layer (3) which form a multilayer structure, which are integrated by a high temperature extrusion in-mold compounding process to form a multilayer structure;
   wherein the functional layer (1) is disposed between the condensation layer (2) and the diffusion layer (3), the functional layer (1) includes a main layer (11) and quantum dots (12) uniformly distributed in main layer (11);
   wherein the main layer (11) comprises a first main layer (111) and a second main layer (112) combined with each other, said quantum dots (12) include red fluorescence quantum dots (121) and green fluorescence quantum dots (122); the first main layer (111) adheres to one side of condensation layer (2); the second main layer (112) adheres to one side of diffusion layer (3); the red fluorescence quantum dots (121) and green fluorescence quantum dots (122) are arranged side by side to form a plurality of quantum dots arranged in a uniformly distributed pattern wherein the pattern shape resembles a strip, and the strip and the other strip are arranged at equal intervals;
   wherein the condensation layer (2) includes a condensation substrate layer (21) and condensation bulges (22) distributed over the upper surface of condensation substrate layer (21); wherein the condensation bulges (22) are continuous semicircular or arc bulge structures in cross section, or said condensation bulges (22) are continuous jagged structures in cross section;
   wherein the diffusion layer (3) includes a diffusion substrate layer (31) and diffusion bulges (32) distributed over the lower surface of diffusion substrate layer (31); and a plurality of diffusion particles are added to the diffusion layer (3), the diffusion bulges (32) are continuous semicircular or arc bulge structures in cross section.

* * * * *